(12) United States Patent
Ou-Young

(10) Patent No.: US 6,224,365 B1
(45) Date of Patent: May 1, 2001

(54) APPARATUS FOR SHAPING A SPHERICAL BODY

(76) Inventor: Robert Ou-Young, 5F, No. 52, Lane 148, Li-De Street, Chunh Ho City, Taipei Hsien (TW)

(*) Notice: Subject to any disclaimer, the term of this patent is extended or adjusted under 35 U.S.C. 154(b) by 0 days.

(21) Appl. No.: 09/399,927

(22) Filed: Sep. 21, 1999

(51) Int. Cl.[7] ................................................ A21C 11/00
(52) U.S. Cl. ..................... 425/332; 425/333; 426/496; 426/512
(58) Field of Search .................... 425/332, 333, 425/363; 426/496, 512

(56) References Cited

U.S. PATENT DOCUMENTS

| | | | | |
|---|---|---|---|---|
| 4,008,025 | * | 2/1977 | Campbell | 425/332 |
| 4,025,273 | * | 5/1977 | Mauer et al. | 425/332 |
| 4,124,305 | * | 11/1978 | Benier | 425/332 |
| 4,306,850 | * | 12/1981 | Cummins | 425/332 |
| 5,714,178 | * | 2/1998 | Keener | 425/333 |
| 5,786,016 | * | 7/1998 | Campbell et al. | 426/496 |
| 6,123,537 | * | 9/2000 | Cummins et al. | 425/332 |

* cited by examiner

*Primary Examiner*—Harold Pyon
*Assistant Examiner*—Thu Khanh T. Nguyen
(74) *Attorney, Agent, or Firm*—Pro-Techtor International Services

(57) ABSTRACT

An apparatus including two symmetrical slide members moved relative each other for shaping a cylindrical body into a plurality of spherical bodies, wherein the slide members each have two vertical sidewalls, and a plurality of U-grooves and partition flanges alternatively arranged in parallel between the vertical sidewalls, the U-grooves each having two distal ends and a depth gradually increased from one distal end to the other, the partition flanges each having two distal ends and a thickness gradually increased from one distal end to the other, the vertical sidewalls each having two distal ends and an inner side vertically curved inwards, the inner side having a vertical depth gradually increased from one distal end to the other.

2 Claims, 11 Drawing Sheets

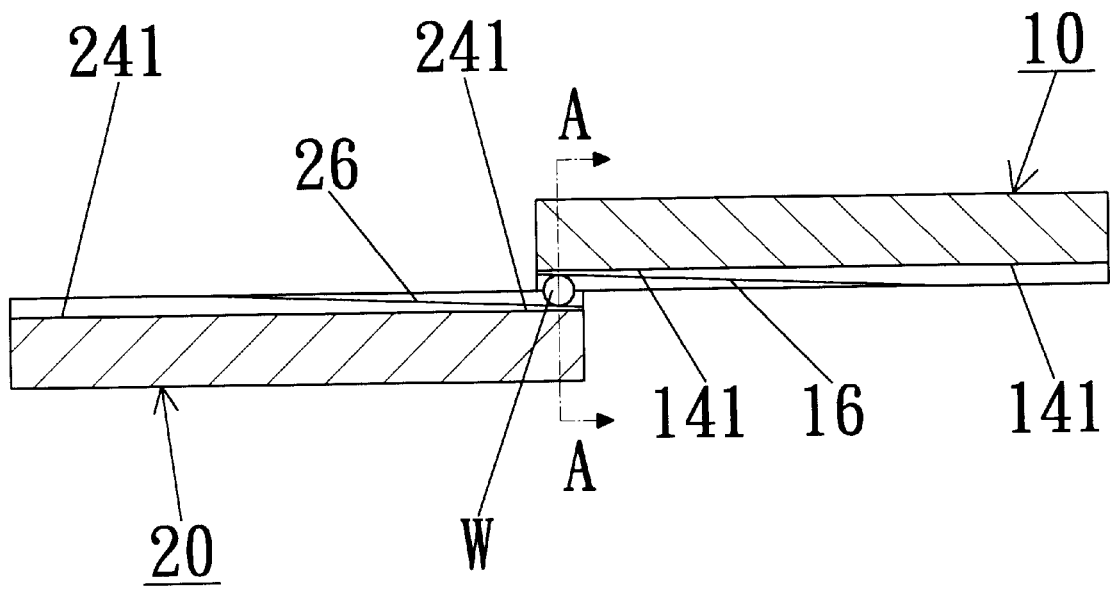
−A−
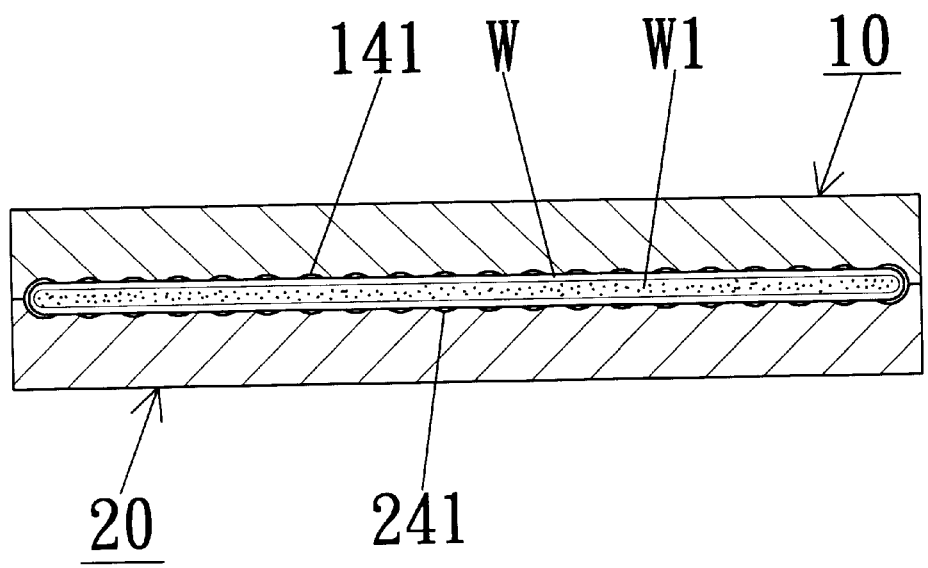
−B−
FIG:5

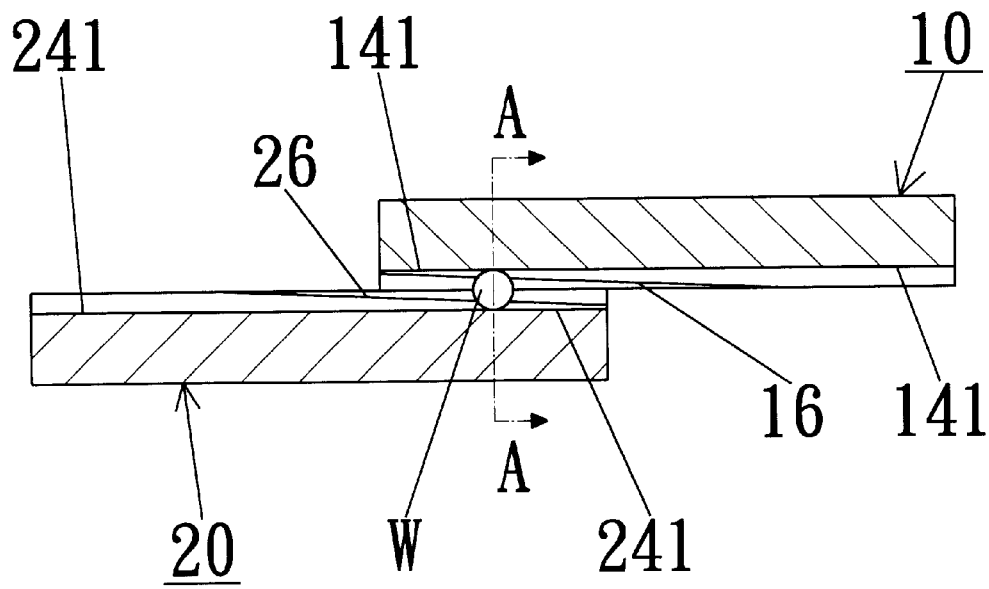
-A-
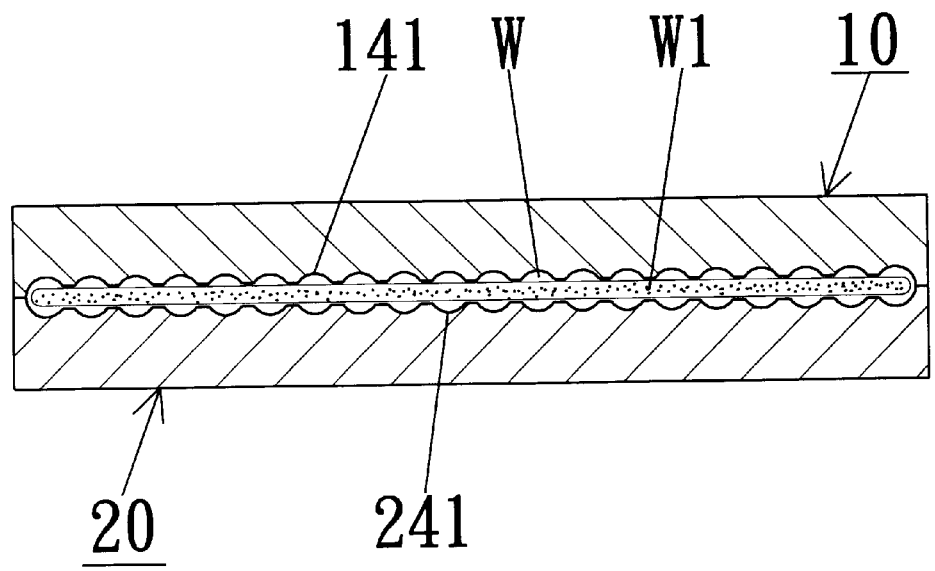
-B-
FIG:6

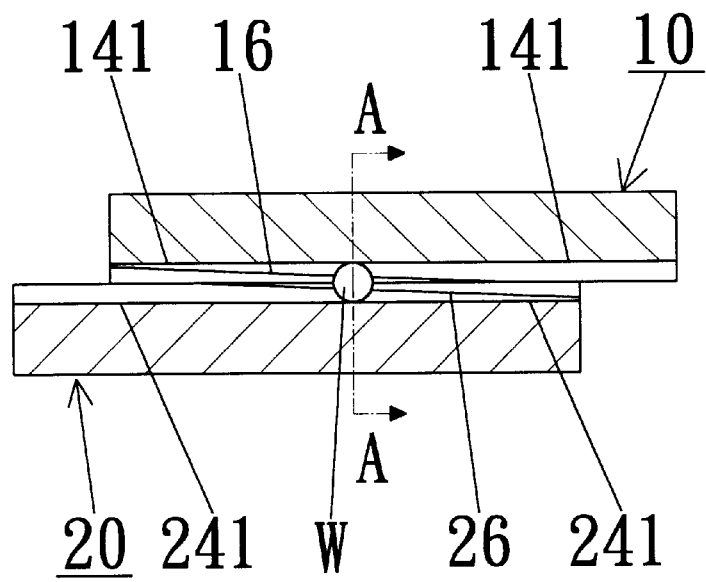
-A-
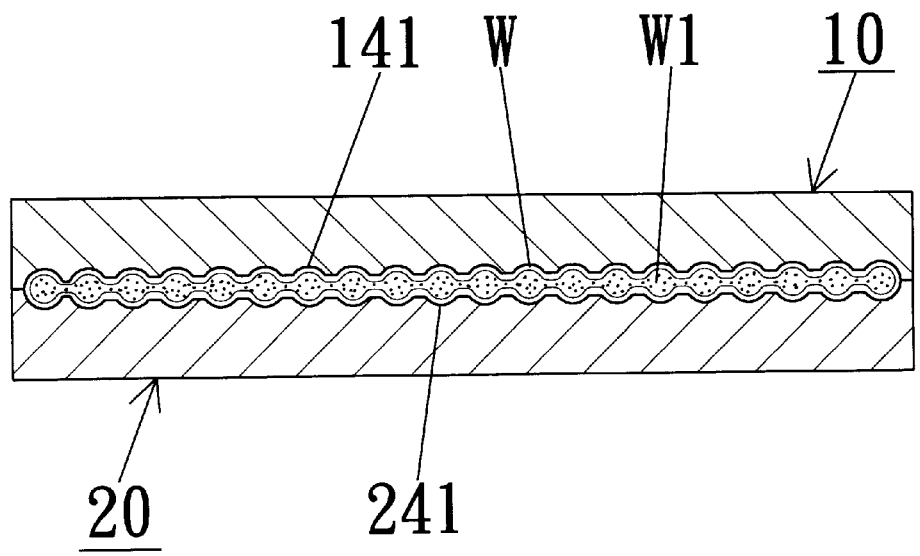
-B-
FIG:7

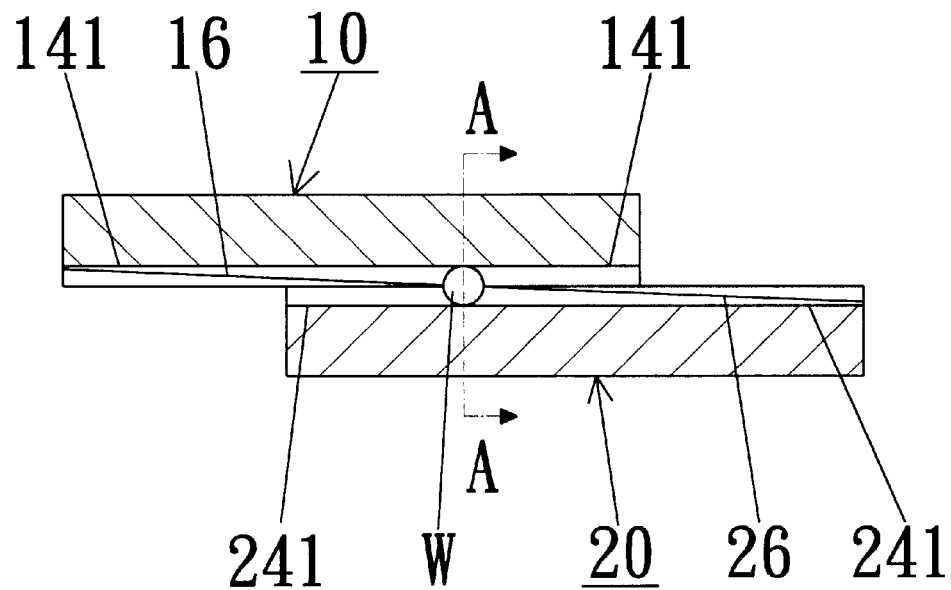
−A−
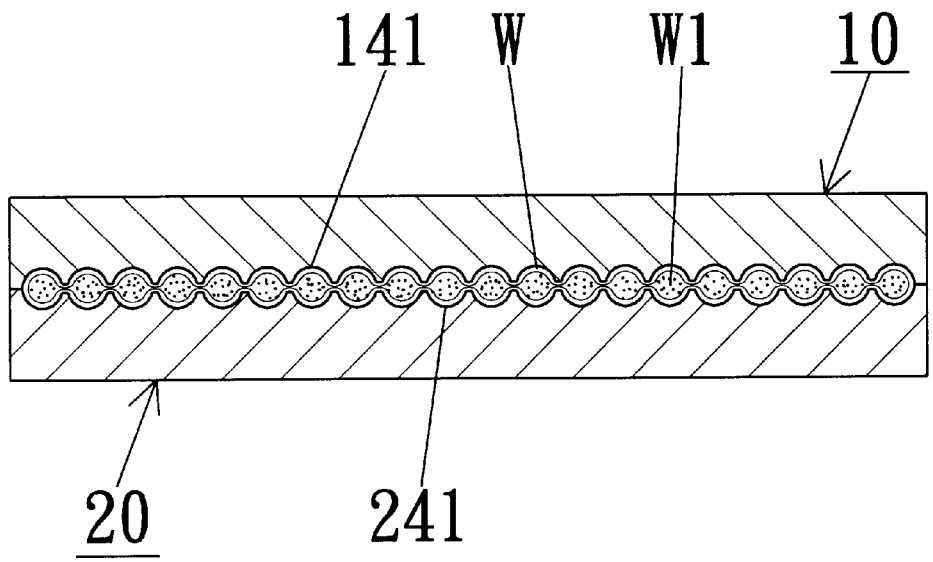
−B−
FIG:8

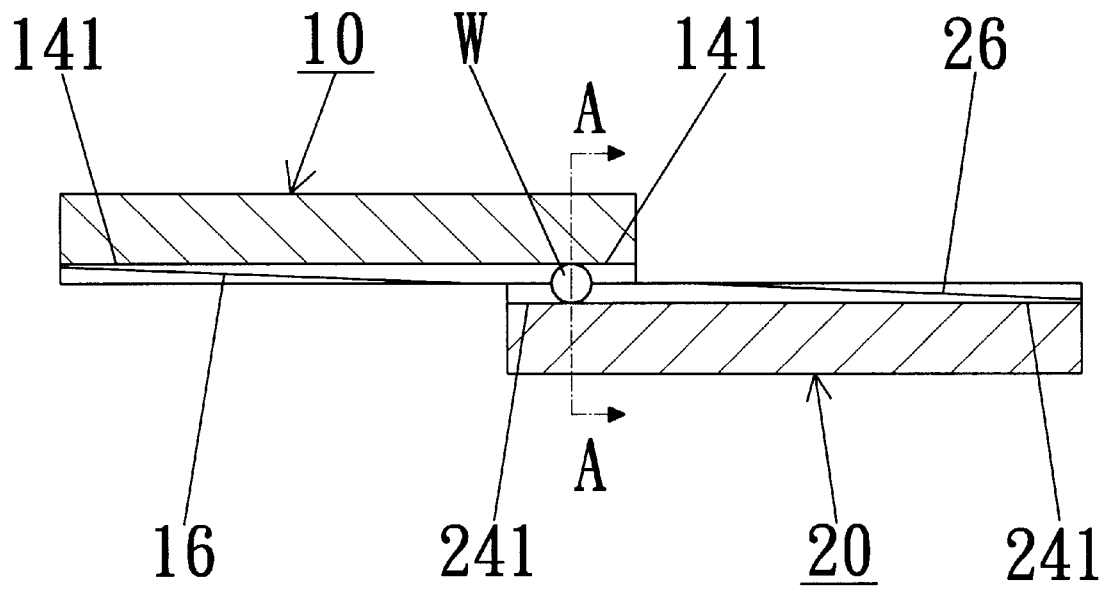
-A-
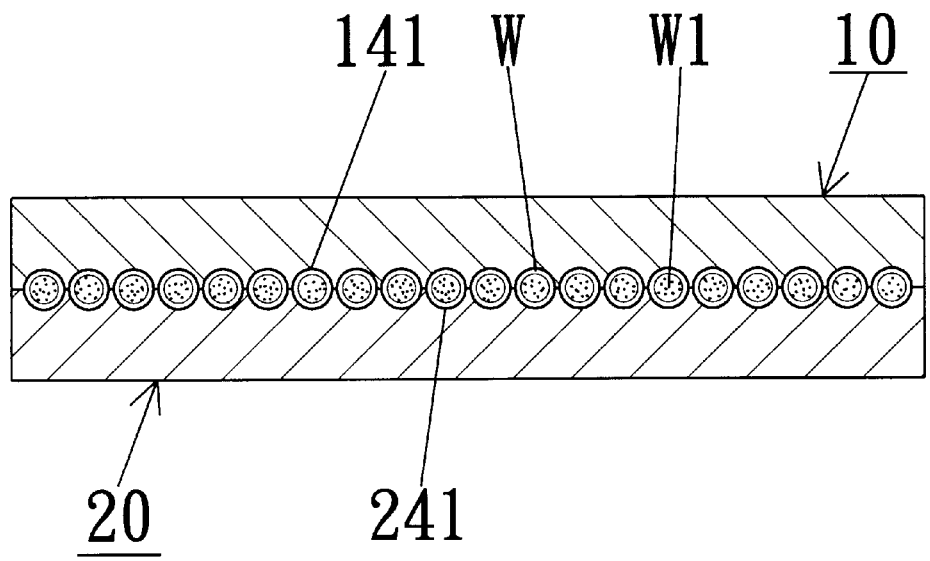
-B-
FIG:9

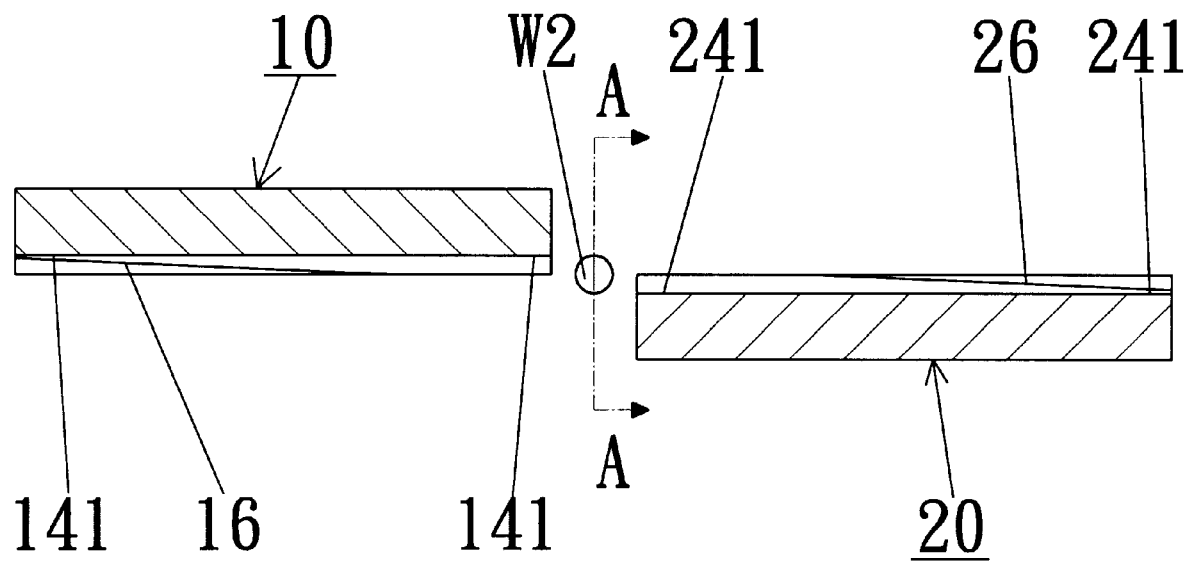
—A—
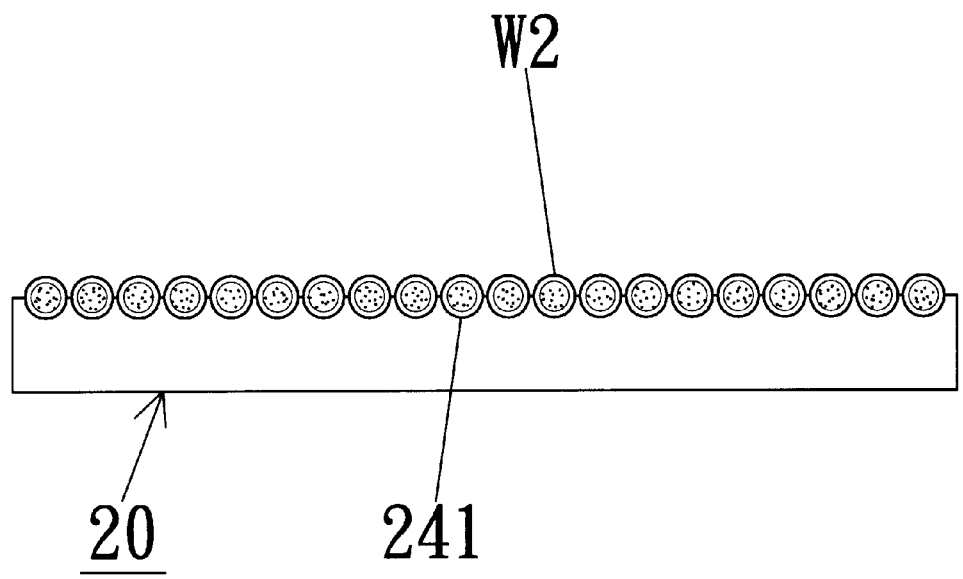
—B—
FIG:10

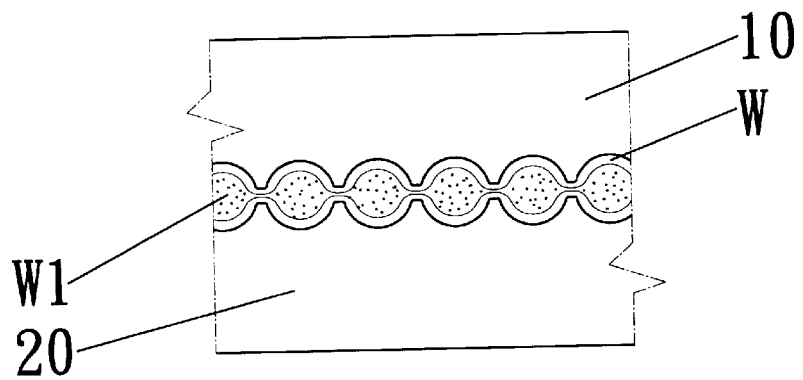
-A-
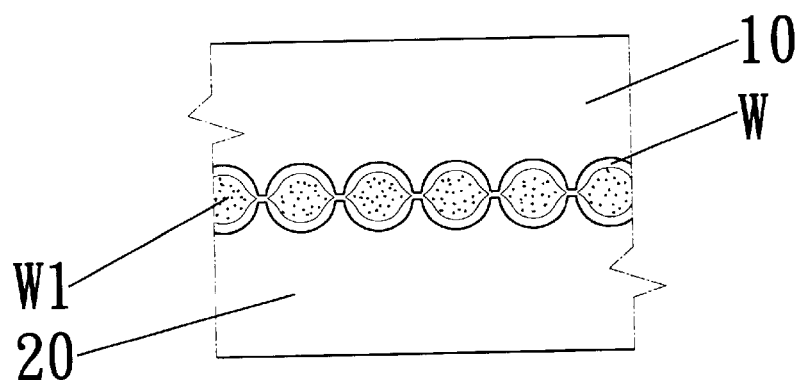
-B-
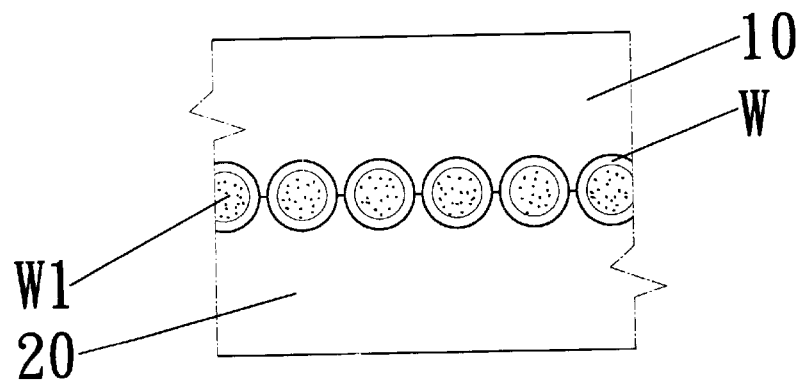
-C-
FIG:11

APPARATUS FOR SHAPING A SPHERICAL BODY

BACKGROUND OF THE INVENTION

The present invention relates to an apparatus for shaping a spherical body consisting of dough crust and a filling (for example, balls of glutinous rice), and more particularly to a high performance spherical body shaping apparatus which is comprised of two sliding members which sliding on each other to rub a fed body into a spherical body.

China patent no. 96230270.8 discloses an apparatus for shaping a spherical body, which comprises two parallel rolls closely attached to each other. The rolls each have a semispherical recess at the periphery. The semispherical recess at each roll constricts a continuously fed cylindrical body. The rolls are rotated in reversed directions so as to constrict the cylindrical body and to shape the spherical body. This spherical body shaping apparatus still has drawbacks as outlined hereinafter.
1. Because the spherical body is produced simply by constricting the continuously fed cylindrical body, the surface of the spherical body is not smooth enough, and the elasticity of material property is not evenly distributed in the spherical body, resulting in an unsatisfactory taste when cooked.
2. This apparatus is suitable for shaping a spherical body without a filling. When shaping a spherical body consisting of dough crust and a filling, the filling may leaks.

SUMMARY OF THE INVENTION

It is one object of the present invention to provide a spherical body shaping apparatus, which achieves high productivity. It is another object of the present invention to provide a spherical body shaping apparatus, which is practical for shaping a spherical body consisting of dough crust and a filling. The apparatus of the present invention comprises two slide members moved over each other to constrict a cylindrical body consisting of dough crust and a filling into spherical bodies. The slide members each have U-grooves and partition flanges arranged in parallel between two vertical sidewalls. The depth of the U-grooves gradually increases from one end toward the other. The thickness of the partition flanges gradually increases from one end toward the other. When a cylindrical body is moved in between the slide members, the slide members are moved over each other, thereby causing the cylindrical body to be constricted and rubbed into spherical bodies.

BRIEF DESCRIPTION OF THE DRAWINGS

FIG. 5A is a schematic drawing showing the operation of the present invention (Step I).

FIG. 5B is a sectional view taken along line A—A of FIG. 5.

FIG. 6A is a schematic drawing showing the operation of the present invention (Step II).

FIG. 6B is a sectional view taken along line A—A of FIG. 5A.

FIG. 7A is a schematic drawing showing the operation of the present invention (Step III).

FIG. 7B is a sectional view taken along line A—A of FIG. 7A.

FIG. 8A is a schematic drawing showing the operation of the present invention (Step IV).

FIG. 8B is a sectional view taken along line A—A of FIG. 8A.

FIG. 9A is a schematic drawing showing the operation of the present invention (Step V).

FIG. 9B is a sectional view taken along line A—A of FIG. 9A.

FIG. 10A is a schematic drawing showing the operation of the present invention (Step VI).

FIG. 10B is a sectional view taken along line A—A of FIG. 10A.

Figure 1:
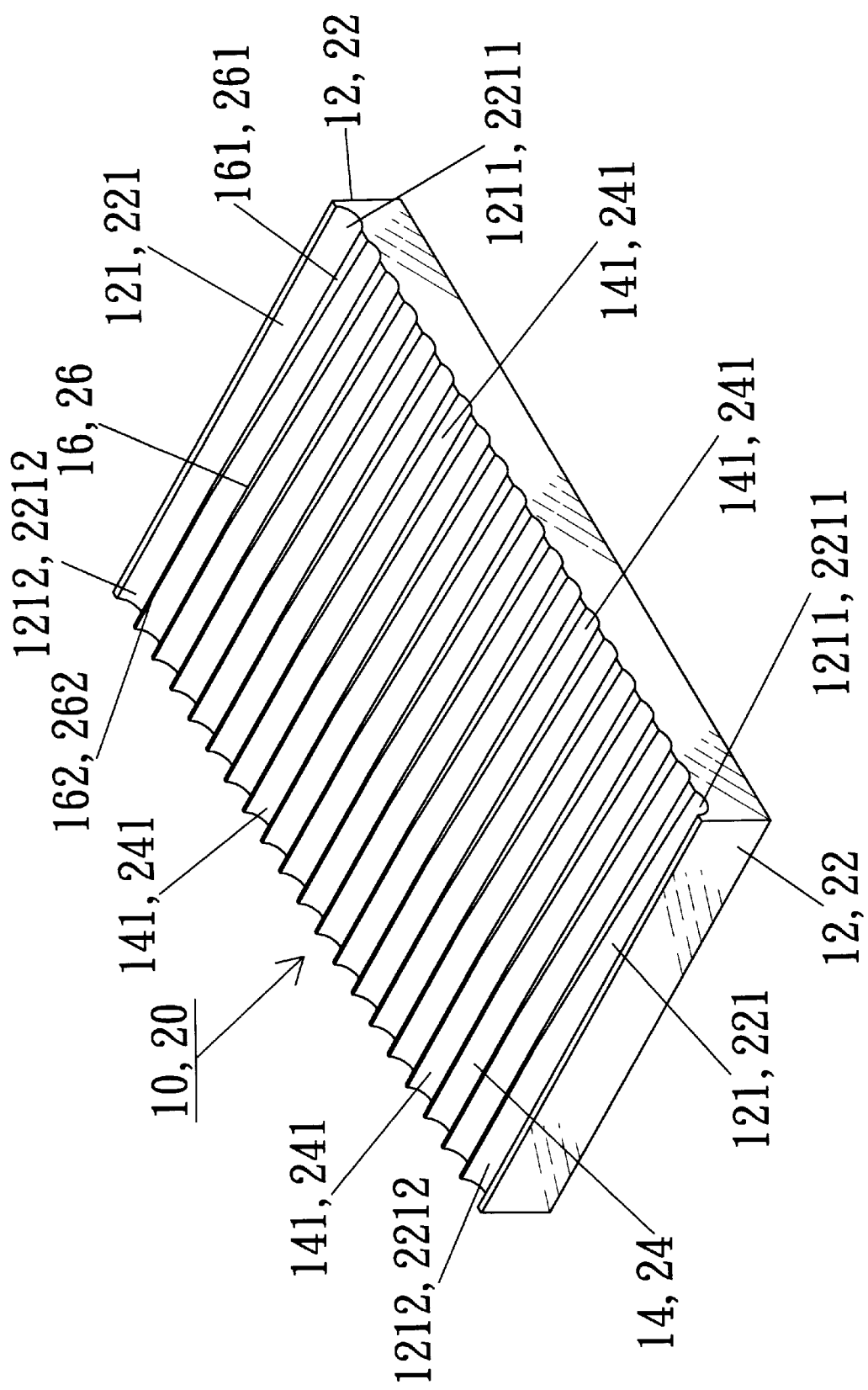
FIG. 1 is a perspective view of a slide member for a spherical body shaping apparatus according to the present invention.
Figure 2:
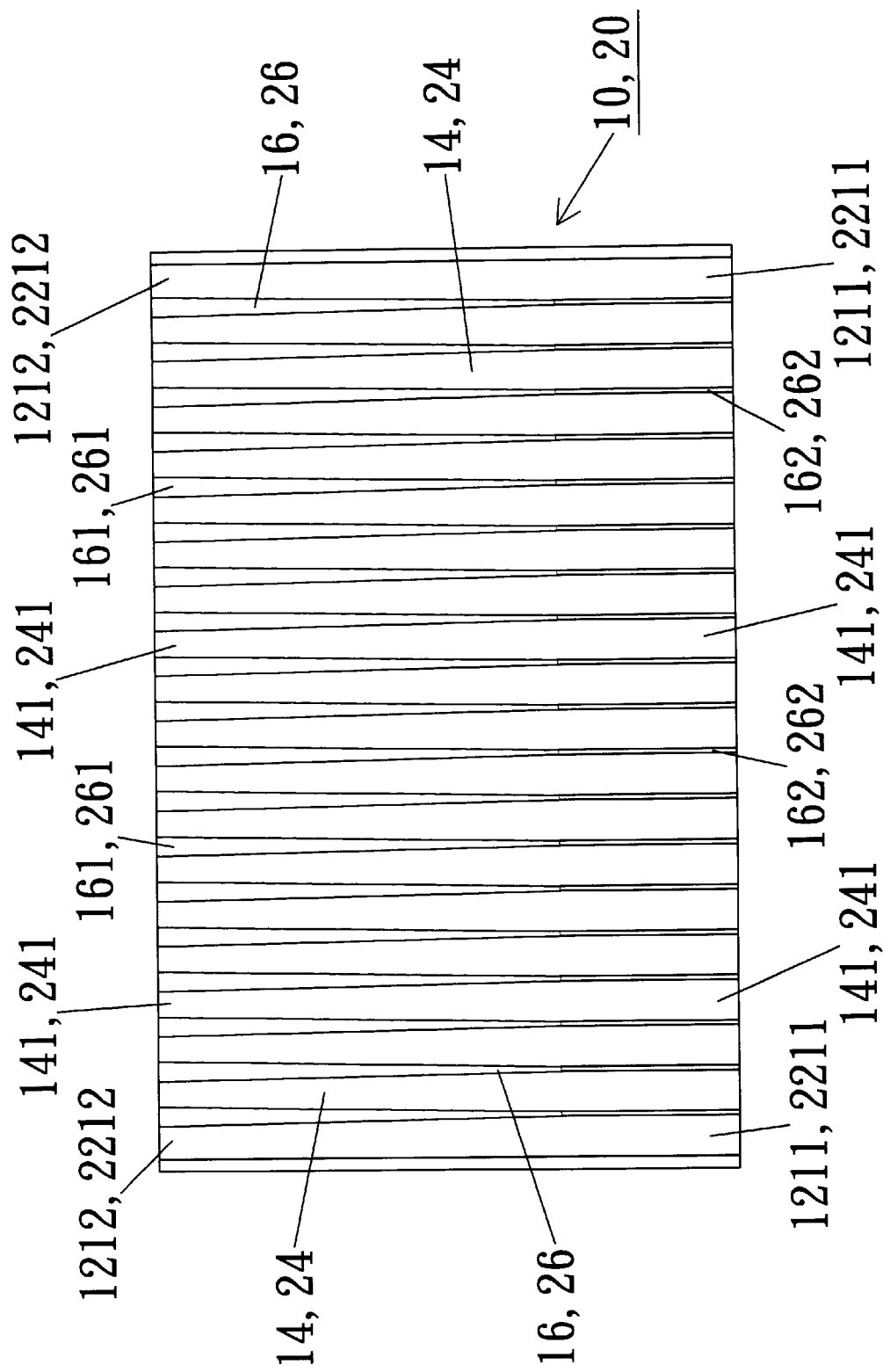
FIG. 2 is a top view of the slide member shown in FIG. 1.
Figure 3:
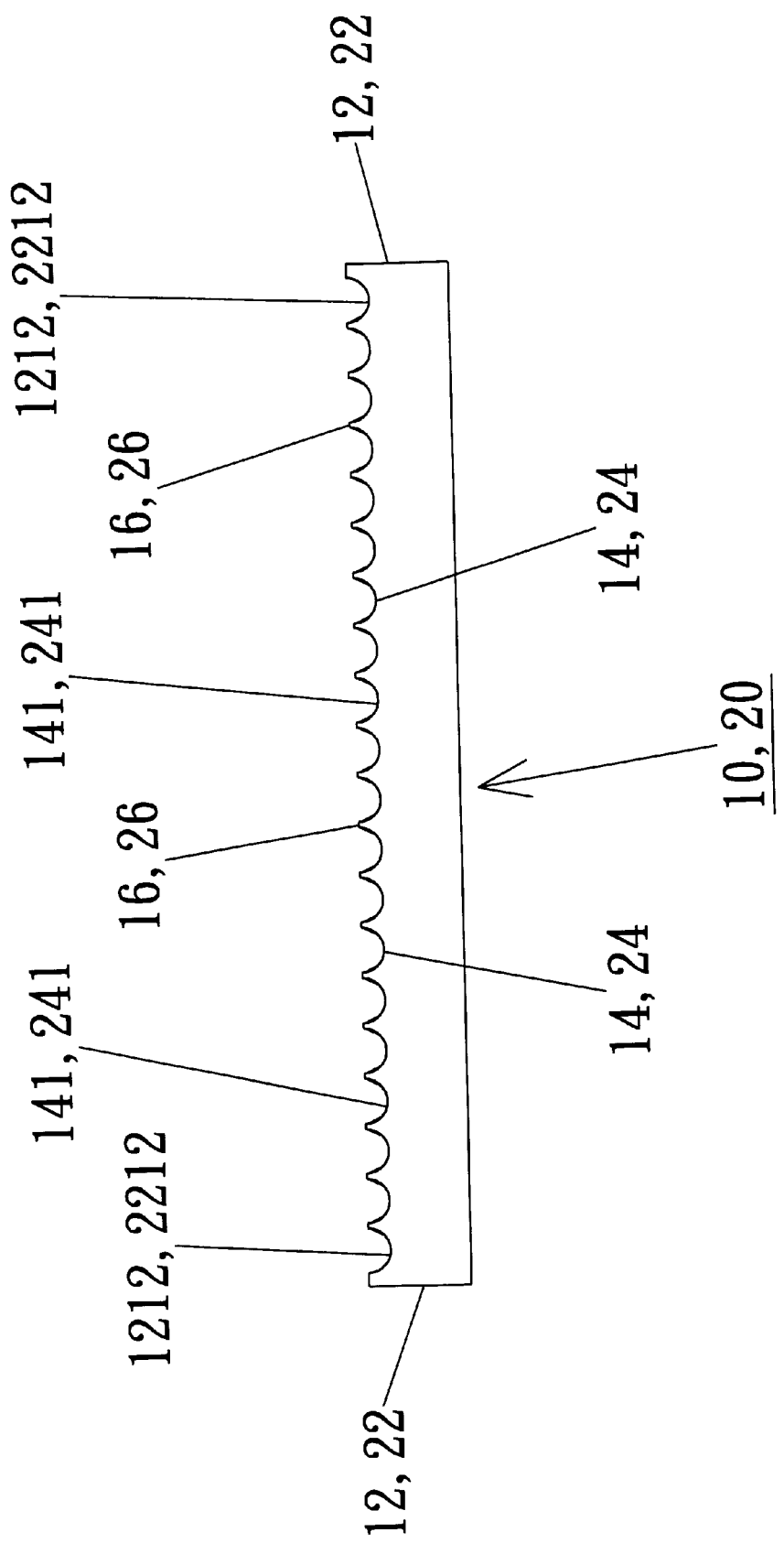
FIG. 3 is a front view of the slide member shown in FIG. 1.
Figure 4:
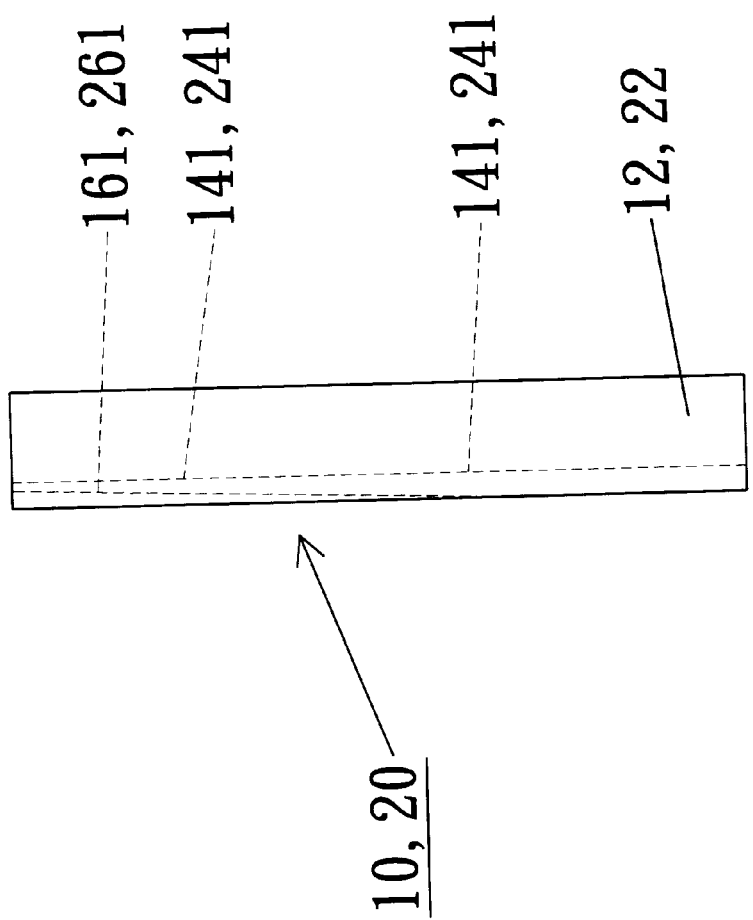
FIG. 4 is a side view of the slide member shown in FIG. 1.

FIGS. from 11A through 11C are continuous drawings showing the continuously fed cylindrical body constricted, spherical bodies shaped according to the present invention.

DETAILED DESCRIPTION OF THE PREFERRED EMBODIMENT

Referring to FIGS. from 1 through 5, an apparatus for shaping a spherical body in accordance with the present invention is shown comprised of two symmetrical slide members, namely, the upper slide member 10 and the bottom slide member 20. The slide members are flat sliding plates moved over each other to constrict a cylindrical body, and to shape the constricted cylindrical body into spherical bodies. The slide members 10 and 20 each comprise two vertical sidewalls 12 or 22, a plurality of U-grooves 14 or 24 and partition flanges 16 or 26 alternatively arranged in parallel between the sidewalls 12 or 22. The U-grooves 14 or 24 each have different depths at two distal ends 141 or 241, i.e., the depth of the U-grooves 14 or 24 gradually increases from one end toward the other. The partition flanges 16 or 26 each have a thickness gradually decreased from one end 161 or 261 toward the other 162 or 262. The vertical sidewalls 12 or 22 each have an inner side 121 or 221 vertically curved inwards. The vertical depth of the inner side 121 or 221 gradually decreases from one end 1212 or 2212 toward the other 1211 or 2211.

Referring to FIGS. from 6 through 10 and FIG. 5 again, a cylindrical body W consisting of dough crust and a filling W1 is delivered in between the upper slide member 10 and the bottom slide member 20 (see FIGS. 5A and 5B). When the slide members 10 and 20 are moved over each other (the bottom slide member 20 can be made immovable), the cylindrical body W is forced to move along the U-grooves 14 and 24 from the shadow end toward the deeper, thereby causing the cylindrical body W to be constricted by the U-grooves 14 and 24 and partition flanges 16 and 26. FIGS. 6A through 7B show the cylindrical body W moved to the midpoint at the U-grooves 14 and 24, and processed into a corrugated profile. FIGS. 8A and 8B show the corrugated cylindrical body W continuously moved toward the deeper end at the U-grooves 14 and 24, and linked spherical bodies formed in the U-grooves 14 and 24. FIGS. 9A and 9B show the corrugated cylindrical body W moved to the deeper end, the partition flanges 16. and 28 cut into the corrugated cylindrical body W. FIGS. 10A and 10B show corrugated cylindrical body W completely constricted, spherical bodies W2 produced, and fell out of the slide members 10 and 20 to a finished product carrier (not shown) for output.

FIGS. 11A, 11B and 11C are continuous drawings showing the corrugated cylindrical body W constricted, and cut into spherical bodies.

While only one embodiment of the present invention has been shown and described, it will be understood that various modifications and changes could be made thereunto without departing from the spirit and scope of the invention disclosed.

What the invention claimed is:

1. An apparatus comprising:

two symmetrical slide members, said slide members moving with respect to each other such that a first one of said slide members moves across a second one of said slide members to shape a cylindrical body into a plurality of spherical bodies, said slide members each comprise a plurality of grooves formed by partition flanges, said grooves each having a depth that increases from a first end of said groove to a second end of said groove. and said partition flanges each having a thickness that gradually increases from a first end of said flange to a second end of said flange, such that a width of each of said grooves increases from said first end of said grooves to said second end of said grooves.

2. The apparatus of claim 1 wherein:

said slide members each comprise a pair of opposing vertical sidewalls each of said sidewalls forms a side of one of said grooves.

\* \* \* \* \*